Patented Mar. 28, 1950

2,502,125

UNITED STATES PATENT OFFICE 2,502,125

DEBROMINATION OF POLYBROMO-PYRIDINE

Harry F. Brust, Midland, Mich., assignor to The Dow Chemical Company, Midland, Mich., a corporation of Delaware No Drawing. Application April 24, 1948, Serial No. 23,142

6 Claims. (Cl. 260—290)

This invention concerns a method of removing bromine from polybromopyridine compounds. It pertains especially to the preparation of monobromopyridine by reduction of dibromopyridine compounds, and relates more particularly to the preparation of 3-bromopyridine by reduction of 3,5-dibromopyridine.

In the preparation of monobromopyridine by reaction of bromine with pyridine and with pyridine salts of hydrogen chloride or hydrogen bromide there is obtained a considerable amount of dibromopyridine together with lesser amounts of higher brominated pyridine compounds as a by-product. The polybromopyridine compounds which are formed at the expense of the desired monobromopyridine product, are not in demand and heretofore have been a waste product.

It is an object of this invention to provide a method of converting polybromopyridine compounds to monobromopyridine compounds so as to increase the yield of the latter. Another object is to provide a method of selectively reducing dibromopyridine compounds in the presence of hydrogen and a catalyst to form monobromopyridine compounds and pyridine. Still another object is to provide a method of making 3-bromopyridine and 2-bromopyridine by reduction of 3,5-dibromopyridine and 2,6-dibromopyridine, respectively. Other and related objects will be apparent as the invention is described in greater detail.

The foregoing and related objects are obtained by reacting hydrogen with polybromopyridine compounds as hereinafter described.

In producing monobromopyridine by the method of the invention, a heated mixture of hydrogen and vapors of polybromopyridine, preferably dibromopyridine or tribromopyridine, is passed over a nickel catalyst at temperatures between 400° C. and 650° C. The reaction is usually carried out at atmospheric pressure or thereabout, but it may be accomplished at superatmospheric or subatmospheric pressure.

The catalyst is preferably nickel in a finely divided form, supported on an inert carrier such as silica, quartz, porcelain, or the like, although the nickel may be used in massive or less finely divided form, e. g. as nickel metal screen, beads, shot, turnings, wire, ribbon, etc. A finely divided nickel catalyst may be prepared by known procedure, e. g. dissolving a decomposable soluble nickel salt such as nickel nitrate in water, wetting a carrier such as those just described with the solution, drying the wetted material, and thereafter reducing the nickel salt or oxide by heating in an atmosphere of hydrogen.

The invention is hereinafter more fully described employing 3,5-dibromopyridine as the polybromopyridine compound to be reduced, although it is to be understood that the process is equally applicable to the reduction of other polybromopyridine compounds such as 2,6-dibromopyridine, tribromopyridine, and the like, or mixtures of such polybromopyridine compounds.

In practice of the invention the hydrogen is preferably employed in amounts corresponding to from 0.5 to 3 molecular proportions per molecular proportions per molecular equivalent of bromine to be removed from the polybromopyridine compound. Greater or lesser proportions of hydrogen may be employed, but yield a proportionate increase or decrease in the amount of bromine removed from the polybromopyridine compound. For instance, use of considerably more than 3 mols of hydrogen per mol of 3,5-dibromopyridine usually results in a product consisting principally of pyridine. When the molecular proportion of hydrogen employed is less than 0.5 mol per mol of 3,5-dibromopyridine, the proportion converted to 3-bromopyridine per pass through the catalyst bed, becomes so small that the process has little practical utility. Maximum yields of monobromopyridine are usually obtained by controlling the ratio of hydrogen to dibromopyridine, in the mixture of vapors fed to the reaction zone or catalyst bed, at from 0.5 to 3 mols of hydrogen per mol of dibromopyridine.

The contact time, i. e. the time required for a unit volume of the vapors to traverse the catalyst bed, should, of course, be limited to avoid excessive thermal decomposition of the pyridine compounds. At the higher temperatures a contact time of only a fraction of a second is sufficient to convert dibromopyridine, by removal of a bromine atom and substitution by hydrogen, to monobromopyridine. I have found that the best yields of 3-bromopyridine for any given molecular proportion of hydrogen and 3,5-dibromopyridine are, in general, obtained by employing a contact time of from 0.1 to 10 seconds at the above-described temperatures.

In a preferred practice of the invention, I have found good yields of 3-bromopyridine to be obtained, with minimum formation of decomposition products, by passing a mixture consisting of substantially equal molecular proportions of 3,5-dibromopyridine and hydrogen over nickel at a temperature between 450° C. and 500° C. and at a rate such that the contact time is from 0.5 to 3 seconds.

After operating the process, e. g. for from three to eight hours, the activity of the catalyst decreases. The process is then interrupted for purpose of replacing or reactivating the catalyst. The catalyst may be reactivated by first purging with steam or inert gas then passing air, or preferably a mixture of air and steam, through the heated catalyst bed to burn off the carbon and thereafter passing hydrogen over the catalyst at a temperature between 400° C. and 550° C., usually for from 30 to 60 minutes. The temperature of the catalyst bed should not exceed 700° C. and preferably should not exceed 650° C. during the step of burning off of the carbon. The temperature during burn off may be controlled by varying the amount of steam employed as diluent. It usually requires from 2 to 3 hours to burn off the carbon at temperatures between 450° C. and 650° C. Two or more beds of catalyst may advantageously be employed in such manner that one bed of catalyst is being reactivated while the other is in operation. Thus, the process can be carried out in continuous manner.

The vapors flowing from the reaction zone comprise hydrogen bromide, combined with pyridine and monobromopyridine, and usually considerable amounts of unconsumed hydrogen and polybromopyridine. The mixture is corrosive to iron and other structural metals, particularly when wetted with water, and the apparatus for conducting the reaction and for collecting the products may advantageously be composed of, or lined with, a corrosion-resistant material such as an acid-resistant metal or preferably glass, enamel, or ceramic-ware.

The products may be condensed by cooling the reaction vapors, but this is inconvenient since unreacted polybromopyridine may solidify in the vapor line and cause plugging. The products are preferably recovered by scrubbing the reaction vapors with water, or an aqueous solution of an acid, e. g. hydrochloric or hydrobromic acid, to form a solution of salts of the pyridine compounds. The resultant solution may be treated with a strong alkali, e. g. an aqueous solution of sodium or potassium hydroxide, to liberate the pyridine compounds which may then be steam distilled from the mixture. The organic component of the steam distillate is dried and fractionally distilled to obtain separate fractions of pyridine, monobromopyridine and unreacted polybromopyridine. The latter may be recycled in the process.

The reaction products are preferably recovered by first filtering the solution of the salts of the pyridine compounds to remove insoluble material and then distilling the filtered solution to remove a substantial proportion of the acid as distillate. Such distillate may again be used to absorb reaction product. The residue from the distillation, consisting of a solution of the salts of the pyridine compounds, is diluted with water to precipitate unreacted polybromopyridine compounds and the polybromopyridine then separated by conventional manner, e. g. filtering. The filtrate is neutralized or made slightly alkaline with an alkali to liberate the remaining pyridine compounds which are separated by steam distillation, dried and fractionally distilled.

Alternate procedure of separating the unreacted polybromopyridine compounds from the aqueous solution is to partially neutralize the acid solution with sodium hydroxide to a pH of from 1.0 to 1.5 and thereafter filter the mixture to remove the solid polybromopyridine compound. The filtrate is then neutralized or made slightly alkaline with sodium hydroxide to liberate the remaining pyridine bases which are separated from the solution by steam distillation. The distillate is treated with solid sodium hydroxide or a concentrated aqueous solution thereof, e. g. 50 per cent NaOH, and the organic layer separated, dried and fractionally distilled to obtain separate fractions of pyridine, monobromopyridine and small amounts of polybromopyridine as residue.

The following examples illustrate practice of the invention, but are not to be construed as limiting the scope thereof:

*Example 1*

3,5-dibromopyridine was vaporized in an iron vessel and the vapors fed at a rate of 3 pounds per hour into admixture with a substantially equimolecular proportion of hydrogen. The vapor mixture was heated to a temperature of 400° C. to 500° C. by passage through a ceramic preheater and then immediately passed through a bed of finely divided nickel supported on silica inside a ceramic tube and heated to a temperature of 400° C. to 500° C. The contact time was 8 to 9 seconds. After operating for 5 hours, the reaction was discontinued and the catalyst regenerated. Regeneration was accomplished by first purging with steam then passing a mixture of air and steam through the catalyst bed for 3 hours to burn off the carbon. The temperature during burn off was maintained between 400° C. and 500° C. by varying the proportion of steam to air. After burn off, the nickel was reactivated by passing hydrogen through the catalyst bed for 30 minutes at a temperature of 450° C. to 550° C. The reaction was then continued with the reactivated catalyst and the cycle repeated at intervals of from 3 to 5 hours until a total of 78.5 pounds (0.33 mol) of 3,5-dibromopyridine had been used. The reaction product, as formed, was treated with sufficient 15 per cent by weight aqueous hydrochloric acid solution to dissolve the pyridine compounds and the remaining gaseous products were scrubbed with a similar aqueous solution of hydrochloric acid. The aqueous acid solutions containing the condensed reaction products were withdrawn and filtered to remove insoluble material. The filtrate was then partially neutralized with an aqueous solution of sodium hydroxide to a pH of from 1.0 to 1.5 to liberate unreacted 3,5-dibromopyridine. The partially neutralized mixture was filtered and the solid 3,5-dibromopyridine washed with water and dried. Twenty nine pounds (0.122 mol) of unreacted 3,5-dibromopyridine were recovered. The filtrate was made slightly alkaline with aqueous sodium hydroxide solution and the remaining pyridine bases separated from the aqueous solution by steam distillation. The distillate was treated with solid sodium hydroxide and the organic layer separated, dried and purified by fractional distillation. There was obtained 9.1 pounds (0.115 mol) of pyridine, 10 pounds (0.063 mol) of 3-bromopyridine, and a small amount, i. e. less than 0.25 pound, of solid residue which was found to be chiefly unreacted 3,5-dibromopyridine. This represents a 63 per cent conversion of the 3,5-dibromopyridine with yields of 55.3 per cent pyridine and 30.3 per cent 3-bromopyridine based on the reacted 3,5-dibromopyridine.

*Example 2*

474 grams (2.0 mols) of 3,5-dibromopyridine were passed into a vaporizer at a rate of 13.2 grams per minute. The vapors of 3,5-dibromopyridine were admixed with hydrogen in the proportion of 0.65 mol of hydrogen ($H_2$) per mol of 3,5-dibromopyridine. The vapor mixture was preheated to a temperature between 400° C. and 500° C., and immediately passed over finely divided nickel supported on silica and maintained at a temperature of from 400° C. to 500° C. The reaction products were absorbed in a 15 per cent by weight aqueous hydrochloric acid solution, which was thereafter filtered to remove insoluble material and the filtrate partially neutralized with aqueous sodium hydroxide solution to a pH of 1.0 to 1.5 to liberate 3,5-dibromopyridine. The mixture was filtered and the solid 3,5-dibromopyridine washed with water and dried. 207.5 grams (0.875 mol) of unreacted 3,5-dibromopyridine were recovered. The filtrate was made slightly alkaline with aqueous sodium hydroxide solution and then steam distilled to separate the remaining pyridine bases. The distillate was treated with solid sodium hydroxide and the organic layer separated and analyzed. It contained 26.5 grams (0.335 mol) of pyridine and 71.5 grams (0.451 mol) of 3-bromopyridine.

*Example 3*

384 grams (1.62 mols) of 3,5-dibromopyridine were passed into a vaporizer at a rate of 15.3 grams per minute. The vapors of 3,5-dibromopyridine were mixed with a substantially equimolecular proportion of hydrogen. The mixed vapors were preheated to 400° C. to 500° C. and passed immediately over a bed of catalyst consisting of finely divided nickel supported on silica and heated to a temperature of 400° C. to 500° C. The reaction vapors were treated with a 15 per cent by weight aqueous hydrochloric acid solution to absorb the soluble reaction products. The acid solution was filtered to remove insoluble material and the pyridine bases liberated therefrom by procedure similar to that described in Example 2. There was obtained 256 grams (1.08 mols) of unreacted 3,5-dibromopyridine. The organic layer from the steam distillate contained 12.9 grams (0.163 mol) of pyridine and 30.5 grams (0.193 mol) of 3-bromopyridine.

*Example 4*

56.8 grams (0.239 mol) of 3,5-dibromopyridine were passed into a vaporizer at a rate of 1.2 grams per minute and the vapors mixed with hydrogen in the proportion of 2.5 mols of hydrogen per mol of 3,5-dibromopyridine. The mixed vapors were preheated to 500° C. and passed over a bed of a catalyst consisting of pieces of nickel screen woven from metal ribbon approximately 0.02 inch wide by 0.007 inch thick. The soluble reaction products were dissolved in a 15 per cent by weight aqueous hydrochloric acid solution and the pyridine bases separated by procedure similar to that described in Example 2. The organic layer from the steam distillate was analyzed and found to contain 2.5 grams (0.032 mol) of pyridine and 9.5 grams (0.058 mol) of 3-bromopyridine. 35.5 grams (0.148 mol) of unreacted 3,5-dibromopyridine were recovered. This represents a conversion of 37.6 per cent of the 3,5-dibromopyridine. The yields were 35.1 per cent pyridine and 63.7 per cent 3-bromopyridine, respectively, based on the 3,5-dibromopyridine reacted.

Other modes of applying the principle of my invention may be employed instead of those explained, change being made as regards the method herein disclosed, provided the step or steps stated in any of the following claims or the equivalent of such stated step or steps be employed.

I therefore particularly point out and distinctly claim as my invention:

1. The method of making monobromopyridine which comprises passing vapors of dibromopyridine in admixture with from 0.5 to 3 molecular proportions of hydrogen over nickel at a reaction temperature between 400° C. and 650° C. and separating monobromopyridine from the reaction vapors.

2. The method of making 3-bromopyridine which comprises passing vapors of 3,5-dibromopyridine in admixture with hydrogen over nickel at a reaction temperature between 400° C. and 650° C. and separating 3-bromopyridine from the reaction vapors.

3. The method of making 3-bromopyridine which comprises passing vapors of 3,5-dibromopyridine in admixture with from 0.5 to 3 molecular proportions of hydrogen over nickel at a reaction temperature between 450° C. and 500° C. and separating 3-bromopyridine from the reaction vapors.

4. The method of making monobromopyridine which comprises passing vapors of dibromopyridine in admixture with from 0.5 to 3 molecular proportions of hydrogen over nickel at a reaction temperature between 400° C. and 650° C., treating the reaction products with a dilute aqueous solution of hydrochloric acid to form an aqueous solution of the pyridine compounds, treating the solution with an alkali to render it alkaline, and thereafter separating monobromopyridine from the aqueous solution.

5. The method of making 3-bromopyridine which comprises passing vapors of 3,5-dibromopyridine in admixture with hydrogen over nickel at a reaction temperature between 400° C. and 650° C., treating the reaction products with sufficient water to form an aqueous solution of the resultant pyridine compounds, treating the aqueous solution with an alkali to decompose pyridine salts present in the solution, and separating 3-bromopyridine from the aqueous solution.

6. The method of making 3-bromopyridine which comprises passing vapors of 3,5-dibromopyridine in admixture with from 0.5 to 3 molecular proportions of hydrogen over nickel at a reaction temperature between 450° C. and 500° C., treating the reaction products with an aqueous solution of hydrochloric acid to condense the pyridine compounds, treating the solution with an alkali to render it alkaline, and thereafter separating 3-bromopyridine from the aqueous solution.

HARRY F. BRUST.

REFERENCES CITED

The following references are of record in the file of this patent:

Crouch, J. Amer. Chem. Soc., vol. 65, pages 270–272.